Dec. 16, 1952      S. S. BROWN      2,622,232
ELECTRIC MOTOR AND METHOD OF OPERATION
Filed Dec. 29, 1951
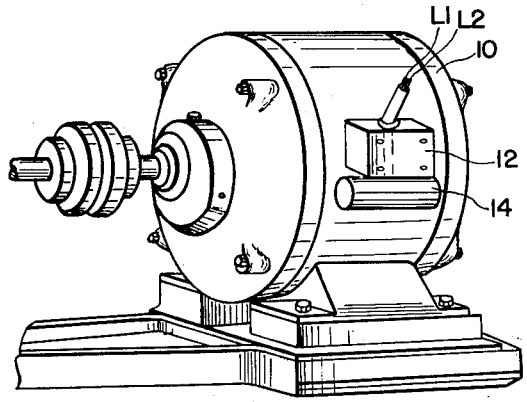
FIG-1
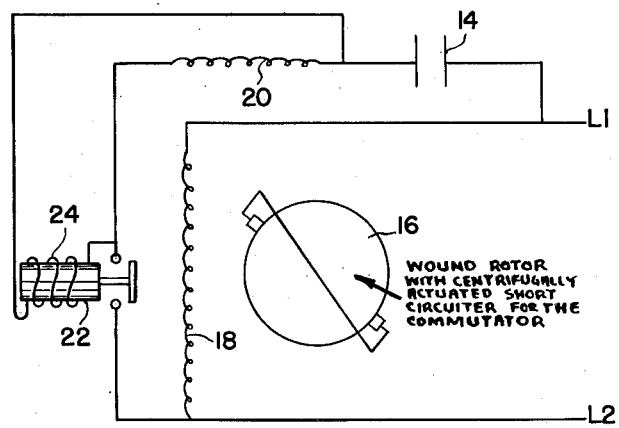
FIG-2
FIG-3
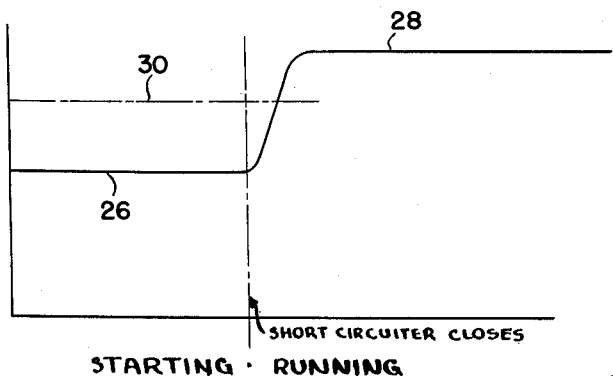
STARTING · RUNNING
INVENTOR
STEFFEN S. BROWN
BY *Toulmin & Toulmin*
ATTORNEYS Patented Dec. 16, 1952

2,622,232

UNITED STATES PATENT OFFICE 2,622,232

ELECTRIC MOTOR AND METHOD OF OPERATION

Steffen S. Brown, Dayton, Ohio, assignor to The Brown-Brockmeyer Company, Dayton, Ohio, a corporation of Ohio Application December 29, 1951, Serial No. 264,056

6 Claims. (Cl. 318—196)

This invention relates to electric motors, particularly to alternating current motors, especially of the repulsion or induction type, or a combination thereof.

Alternating current motors, particularly the smaller size motors of the type referred to, are characterized by being inefficient in operation due to the fact that they are highly self-inductive and run with a lagging power factor. When a large number of these motors are operated together, as in the case of a factory or shop having a number of individually powered machines and appliances, a rather heavy quadrature current load is imposed on the power lines without a corresponding amount of power being generated.

The quadrature current referred to results in a copper loss, not only in the supply lines, but also within the motor itself, and is, thus, objectionable, not only to the user of the motor, but also to the power company supplying the electrical energy.

Certain types of alternating current motors, such as capacitor motors, at least partially overcome these difficulties by including in circuit with the motor a condenser which draws a leading current and thereby at least partially offsets the lagging power factor of the motor, thus improving the overall efficiency of the motor and also improving the load characteristics of the power line supplying the motor.

While capacitor type motors are characterized by the advantage referred to above, they are, nevertheless, not preferred for use in a great many types of installations because of their low starting torque. Such loads as compressors and machine tools which require full working torque in order to bring the motor up to speed, cannot generally be powered by a capacitor type motor. In instances of this nature, where a high starting torque motor is required, a motor having repulsion starting characteristics is much to be preferred because it can be adjusted to have a high starting torque and will, accordingly, come up to speed quickly, even under full load.

The most common types of small alternating current motors are the repulsion start-induction run and the repulsion induction motors, and in most instances, these motors start as repulsion motors and thereafter run at constant speed. The most widely used of these motors is the repulsion start-induction run motor, which is characterized by having means for short circuiting the commutator at a predetermined speed.

Motors of the types referred to above are, however, characterized by the disadvantage of a low power factor and correspondingly inefficient operation, and the primary object of the present invention is to provide an arrangement especially adapted for use with a single phase alternating current motor for overcoming these disadvantages.

In my previously filed application which issued on February 27, 1951, No. 2,543,149, I show an improved motor arrangement in which the movement of the short circuiting mechanism of the motor is employed for modifying the energizing circuit so as to improve the power factor of the motor. The present invention represents an improvement and an advance over the disclosure of that patent.

Accordingly, another particular object of this invention is to provide an improved arrangement operable for automatically improving the power factor of a single phase alternating current motor so that it will run at the best possible power factor and, thus, be efficient in operation.

These and other objects and advantages will become more apparent upon reference to the following description taken in connection with the accompanying drawings in which:

Figure 1 is a perspective view of a typical alternating current motor constructed according to this invention;

Figure 2 is a diagrammatic view showing the preferred manner of arranging the circuit of the motor, according to this invention; and Figure 3 is a graph showing the manner in which an induced voltage in the motor varies and which can, therefore, be used as a control voltage.

In general, my invention comprises the provision in a repulsion or induction motor, of an auxiliary winding of the same number of poles as the main field winding, but in quadrature therewith, and in series with a capacitor and connected in parallel with the main winding. This auxiliary winding is normally out of circuit and is brought into circuit at substantially the same time as the short circuiter of the motor is actuated during the starting period.

The effect of the auxiliary winding is to establish a more uniform field for the rotor to turn in, thereby reducing the noise of operation of the motor and raising the overall efficiency thereof. At the same time, the capacitor-auxiliary winding branch will draw a leading current from the line which will improve the overall power factor of the motor, leading to a still further improvement in the efficiency of operation of the motor.

The aforementioned auxiliary winding preferably has a fewer number of turns than the main winding and may also comprise a smaller wire size, and the capacitor in series therewith is any suitable continuous duty type, such as the ordinary oil filled condenser.

In working with motors of this type and particularly a motor constructed in accordance with my issued patent referred to above, I have found that the induced voltage in the auxiliary winding brought about by the field established by the main winding, undergoes a substantial increase at the moment the short circuiter of the motor is thrown in.

This opened up the possibility of utilizing a voltage responsive relay for bringing the auxiliary winding branch into circuit, and which relay, of course, eliminated the necessity of mounting a switch within the motor to be operated by movement of the short circuiter or brush ring, as in the case of my patent referred to above.

According to this invention, the said relay can be quite small and is preferably mounted outside the motor frame together with the capacitor that is in series with the auxiliary winding.

Referring now to the drawings somewhat more in detail, Fig. 1 is a perspective view of a single phase alternating current motor having a frame 10 on one side of which may be mounted the terminal box 12 and the condenser 14. Power lines L1 and L2 are led into terminal box 12 for the purpose of supplying energy to the motor.

In Fig. 2, the electrical diagram for the motor is diagrammatically illustrated, and in this figure, the armature of the motor bears reference numeral 16, and the main winding of the motor is at 18. It will be noted that armature 16 is of the wound type having a commutator and a centrifugally actuated short circuiter for shorting out the commutator at a predetermined speed. Such rotors are well known and, accordingly, no detailed illustration of one is made in the drawings.

Mounted in the motor in quadrature with main winding 18 is auxiliary winding 20, which is conncted in series with condenser 14, and the entire branch including winding 20 and condenser 14 is connected in parallel with main winding 18.

Serially arranged in the said branch is a relay 22 which is normally open, thereby interrupting the said branch, but which may be closed upon a predetermined voltage being established across the coil 24 thereof. Coil 24 is connected, as shown, in parallel with either all or a part of auxiliary winding 20.

Relay 22 may advantageously be mounted inside terminal box 12 where it can readily be adjusted, repaired or replaced merely by removing the cover of the terminal box and without requiring that either of the end covers of the motor be removed.

In Figure 3, I have illustrated diagrammatically the manner in which the induced voltage in the auxiliary winding changes at the time of throwing in the short circuiter. This chart is not intended to show precisely what occurs in connection with the induced voltage in the auxiliary winding, but merely indicates that there is a substantial change in the voltage as the short circuiter is actuated.

In Figure 3 the induced voltage in the auxiliary winding, before the short circuiter is actuated, is represented at 26 and the induced voltage, after the short circuiter is actuated is indicated at 28. Relay 22 has its coil 24 so selected as to the number of turns and wire size that it is responsive to a voltage indicated by line 30 in Figure 3, which is a value in between that indicated at 26 and that indicated at 28. The net result of so selecting the coil of the relay is that immediately after the short circuiter is thrown in and the induced voltage in the auxiliary winding commences to increase, the relay will close and place the auxiliary winding branch in circuit thereby leading to the beneficial results discussed above.

It will be understood that the present invention could be employed in connection with either plain repulsion start-induction run motors, with those having brush lifting devices, or with those having means other than centrifugal actuators associated therewith.

It will be understood that this invention is susceptible to modification in order to adapt it to different usages and conditions and, accordingly, it is desired to comprehend such modifications within this invention as may fall within the scope of the appended claims.

I claim:

1. In a single phase electric motor of the repulsion start-induction run type; a wound rotor, a main field winding, an auxiliary winding displaced substantially 90 electrical degrees from the main winding, a normally open contactor in series with said auxiliary winding and forming therewith a branch circuit connected in parallel with said main winding, said contactor comprising an operating coil connected in parallel with at least a part of the auxiliary winding so as to close the contactor in response to a predetermined voltage rise in said auxiliary winding, and said auxiliary branch including means for drawing a leading current from the supply line.

2. In a repulsion start-induction run electric motor; a stator and a wound rotor therein, said stator having a main field winding and an auxiliary field winding displaced substantially 90 degrees therefrom, a capacitor in series with said auxiliary winding and forming therewith a branch connected in parallel with at least a part of the said main winding, a normally open contactor in said branch, a coil for operating said contactor to its closed position and connected in parallel with at least a part of said auxiliary winding, and said rotor comprising a short circuiter for the commutator adapted for throwing in at a predetermined speed of said rotor.

3. In a repulsion start-induction run electric motor; a stator and a wound rotor therein, said stator having a main field winding thereon, and an auxiliary field winding displaced substantially 90 degrees therefrom, said wound rotor comprising a commutator and a speed responsive short circuiter for shorting out the commutator at a predetermined rotor speed, a capacitor in series with said auxiliary winding, a normally open contactor also in series with said auxiliary winding, said capacitor, auxiliary winding, and contactor forming a branch connected in parallel with at least a part of said main winding, and an operating coil for closing said contactor and connected in parallel with at least a part of said auxiliary winding for deriving energy therefrom for actuating said contactor to its closed position, said coil being responsive to a voltage in said auxiliary winding that obtains under normal operating conditions substantially immediately after the said short circuiter operates.

4. In a repulsion start-induction run motor; a stator and a wound rotor therein, said stator having a main field winding thereon and an auxiliary field winding displaced substantially 90 electrical degrees therefrom, said auxiliary winding having a capacitor and a normally open contactor in series therewith and the branch containing the capacitor, auxiliary winding and contactor being connected in parallel with said main winding, said rotor comprising a short circuiter for short circuiting the commutator thereof at a predetermined speed, the short circuiting of said commutator during normal operation of the motor resulting in a voltage rise in said auxiliary winding, and an operating coil for closing said contactor and connected in parallel with at least a part of said auxiliary winding and being responsive to a voltage obtaining in said auxiliary winding after the said short circuiter has been actuated.

5. In a repulsion start-induction run motor; a stator having a main field winding, an auxiliary field winding paralleling at least a part of said main field winding and having a capacitor in series therewith, a normally open contactor also in series with said auxiliary winding, and an operating coil for said relay adapted for closing when energized and connected in circuit with said auxiliary winding so as to be energized in response to a predetermined voltage in said auxiliary winding induced therein by said main field winding.

6. In a repulsion start-induction run electric motor of the nature described; a frame having a stator and a wound rotor therein, a main field winding and an auxiliary field winding on said stator in parallel with at least a part of said main winding, a capacitor in series with said auxiliary winding and mounted externally of said frame, a normally open contactor also in series with said auxiliary winding and also mounted externally of said frame, and said contactor having an operating coil connected in parallel with at least a part of said auxiliary winding so as to be responsive to a predetermined induced voltage in said auxiliary winding for closing to place said auxiliary winding and its serially connected capacitor in parallel with the said part of said main winding.

STEFFEN S. BROWN.

REFERENCES CITED

The following references are of record in the file of this patent:

UNITED STATES PATENTS

| Number | Name | Date |
| --- | --- | --- |
| 1,894,805 | Weichel | June 17, 1933 |
| 1,944,090 | Lukens | Jan. 16, 1934 |